United States Patent [19]

Burk et al.

[11] Patent Number: 4,549,762
[45] Date of Patent: Oct. 29, 1985

[54] ARRANGEMENT FOR DISCHARGING HOT AIR FROM THE ENGINE COMPARTMENT OF MOTOR VEHICLES

[75] Inventors: Gerhard Burk, Sindelfingen; Wolfgang Rau, Renningen, both of Fed. Rep. of Germany

[73] Assignee: Daimler-Benz Aktiengesellschaft, Stuttgart, Fed. Rep. of Germany

[21] Appl. No.: 620,727

[22] Filed: Jun. 14, 1984

[30] Foreign Application Priority Data

Jun. 16, 1983 [DE] Fed. Rep. of Germany ....... 3321804

[51] Int. Cl.[4] .............................................. B60K 11/00
[52] U.S. Cl. ..................................... 296/208; 180/68.1
[58] Field of Search .................... 98/2, 2.18; 180/68.1; 296/208

[56] References Cited

U.S. PATENT DOCUMENTS

| | | | |
|---|---|---|---|
| 1,887,724 | 11/1932 | Sieweck | 180/68.1 X |
| 2,162,526 | 6/1939 | Buick | 180/68.1 X |
| 2,733,772 | 2/1956 | Lamb | 180/68.1 |
| 3,392,654 | 7/1968 | Grenier | 98/2.18 X |

FOREIGN PATENT DOCUMENTS

| | | | |
|---|---|---|---|
| 900539 | 7/1949 | Fed. Rep. of Germany | 180/68.1 |
| 840657 | 6/1952 | Fed. Rep. of Germany | |
| 957357 | 2/1950 | France | 180/68.1 |
| 994872 | 11/1951 | France | 180/68.1 |
| 1328439 | 4/1963 | France | 180/68.1 |
| 503639 | 4/1954 | Italy | 180/68.1 |

*Primary Examiner*—Harold Joyce
*Attorney, Agent, or Firm*—Barnes & Thornburg

[57] ABSTRACT

The application relates to an apparatus for discharging hot air generated by an internal combustion engine from the engine compartment of motor vehicles, particularly private motor cars or estate cars, which include front quarter panels extending along the sides of the engine compartment and inner fenders providing front wheel wells. In order to develop an arrangement of this kind so that it will have the simplest possible, weight-saving construction and so that air outlet apertures can be concealed, the present invention discloses that in the region of the engine compartment, air inlets are provided leading into a cavity formed by the arcuate wheel well panel, the front quarter panel, and the wheel well roof panel. Further, this cavity is in communication with air outlets lying in the region of a front vertical door gap and disposed substantially in a transverse plane of the vehicle.

5 Claims, 5 Drawing Figures

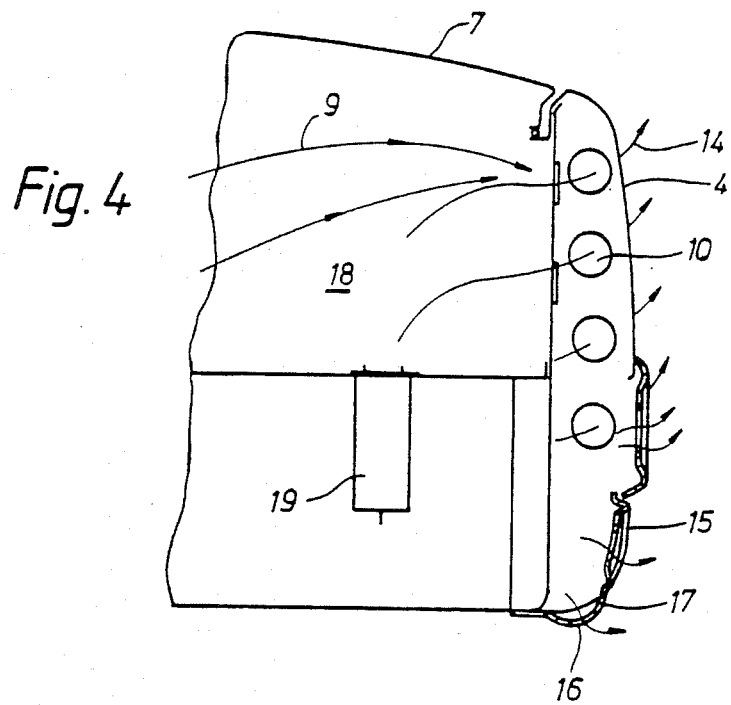
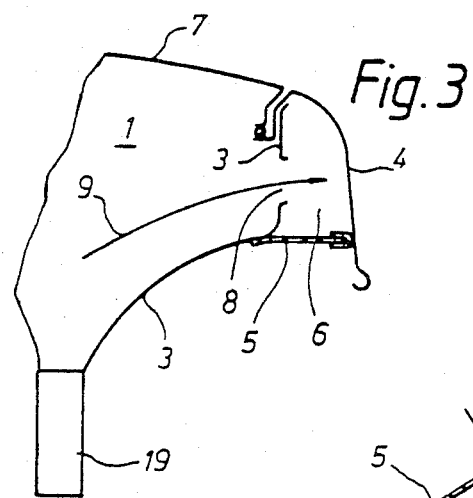
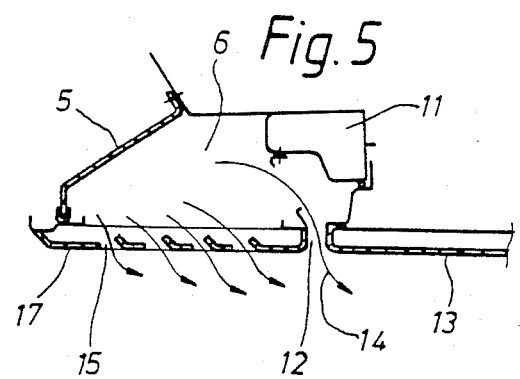

ARRANGEMENT FOR DISCHARGING HOT AIR FROM THE ENGINE COMPARTMENT OF MOTOR VEHICLES

BACKGROUND AND SUMMARY OF THE INVENTION

The invention relates to an apparatus for discharging hot air generated by an internal combustion engine from the engine compartment of a motor vehicle which includes front quarter panels extending along the sides of the engine compartment and inner fenders providing front wheel wells.

Engine compartments of motor vehicles are being closed in to an increasing extent to reduce external noise. Thus, air discharge openings which were previously available (e.g. engine bonnet or hood gaps) no longer exist.

Additional ducts are often installed to discharge the hot air produced in the engine compartment. These ducts may have outlets which lie in a reduced pressure region, so that the air is drawn or sucked out to the surroundings. Consequently a relatively small cross-section is sufficient, which in turn contributes toward noise reduction. However, such additional ducts are expensive and lead to extra weight.

From German Patent Specification No. 840,657 is is also already known to provide, under the engine hood, air guide plates serving to guide the hot air to air outlet openings in a region of a side wall of the vehicle body where a reduced pressure zone is formed. In such an arrangement it is disadvantageous to permit the hot air to leave the engine compartment only at a determined point in the length of the vehicle. Further, the recessed side wall zone and the gill-like outlet apertures would have an optically disturbing effect in many types of vehicle.

It is therefore an object of the present invention to discharge hot air through passages already existing in the vehicle so that the hot air can leave the engine compartment at a plurality of points in the length of the vehicle. It is a further object of the invention to permit the hot air to pass out to the atmosphere through concealed outlet openings.

According to the present invention the hot air discharge problem is solved since air inlet apertures are provided in the region of the engine compartment leading into a cavity or duct defined by an arcuate wheel well panel, a front quarter panel and a wheel well roof, and since this cavity is in communication with air outlet apertures lying in the region of a front vertical door gap and disposed substantially in a transverse plane of the vehicle.

In the case of sports cars having higher engine power it may be advantageous, as a development of the invention, to provide additional air outlet apertures in the outer skin of the quarter panel or of ancillary outer fender panels disposed in that region. In such vehicles visible air outlet apertures could also be regarded as stylistically attractive.

The invention may best be understood by reference to the following description of a preferred embodiment and the accompanying drawing.

BRIEF DESCRIPTION OF THE DRAWINGS

FIG. 3 is a sectional view taken along line III—III in FIG. 1;

FIG. 4 is a sectional view taken along line IV—IV in FIG. 1; and

FIG. 5 is a sectional view taken along line V—V in FIG. 1.

DETAILED DESCRIPTION OF THE DRAWINGS

Figure 1:
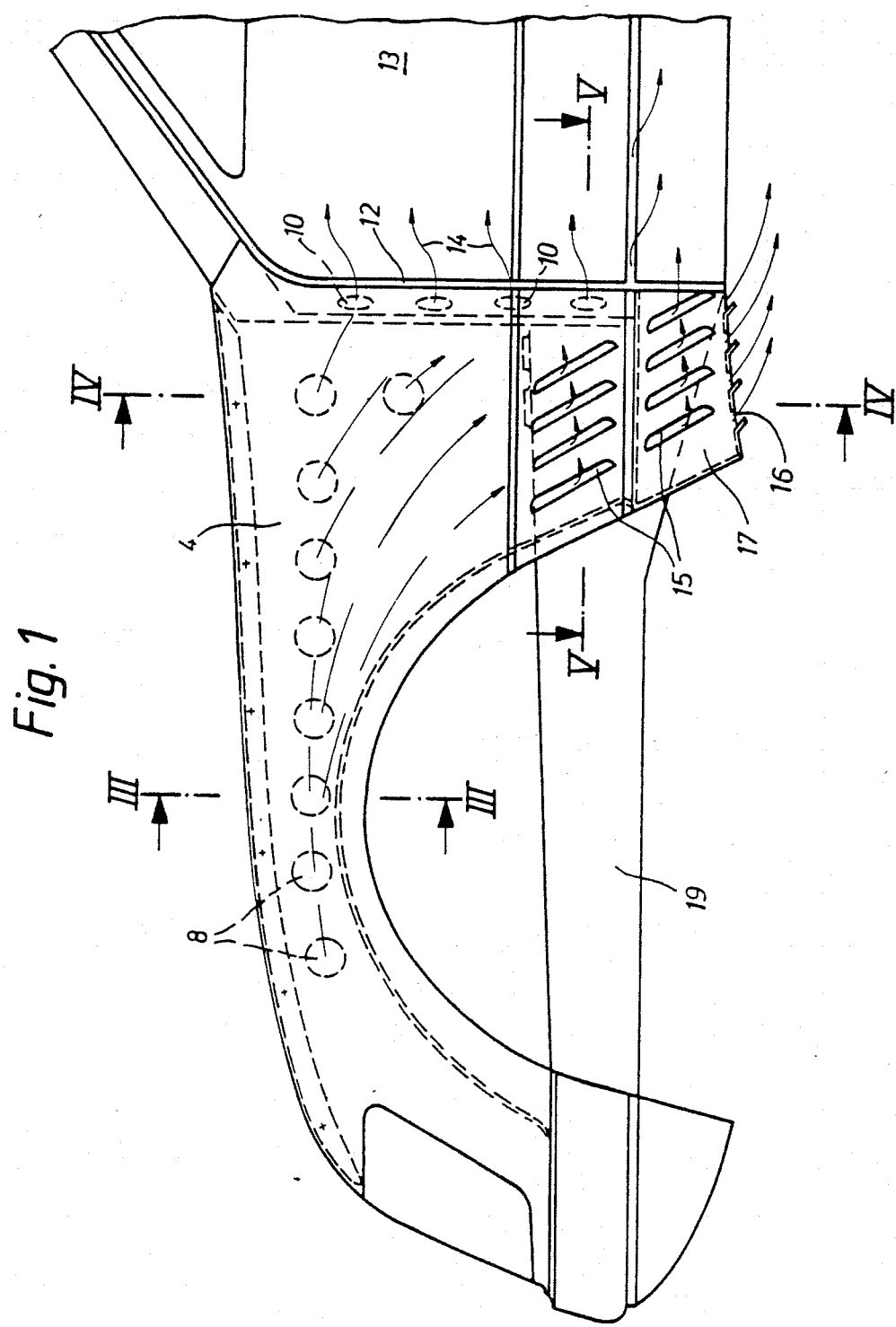
FIG. 1 is a side elevation view of the front part of a motor vehicle body embodying the invention.
Figure 2:
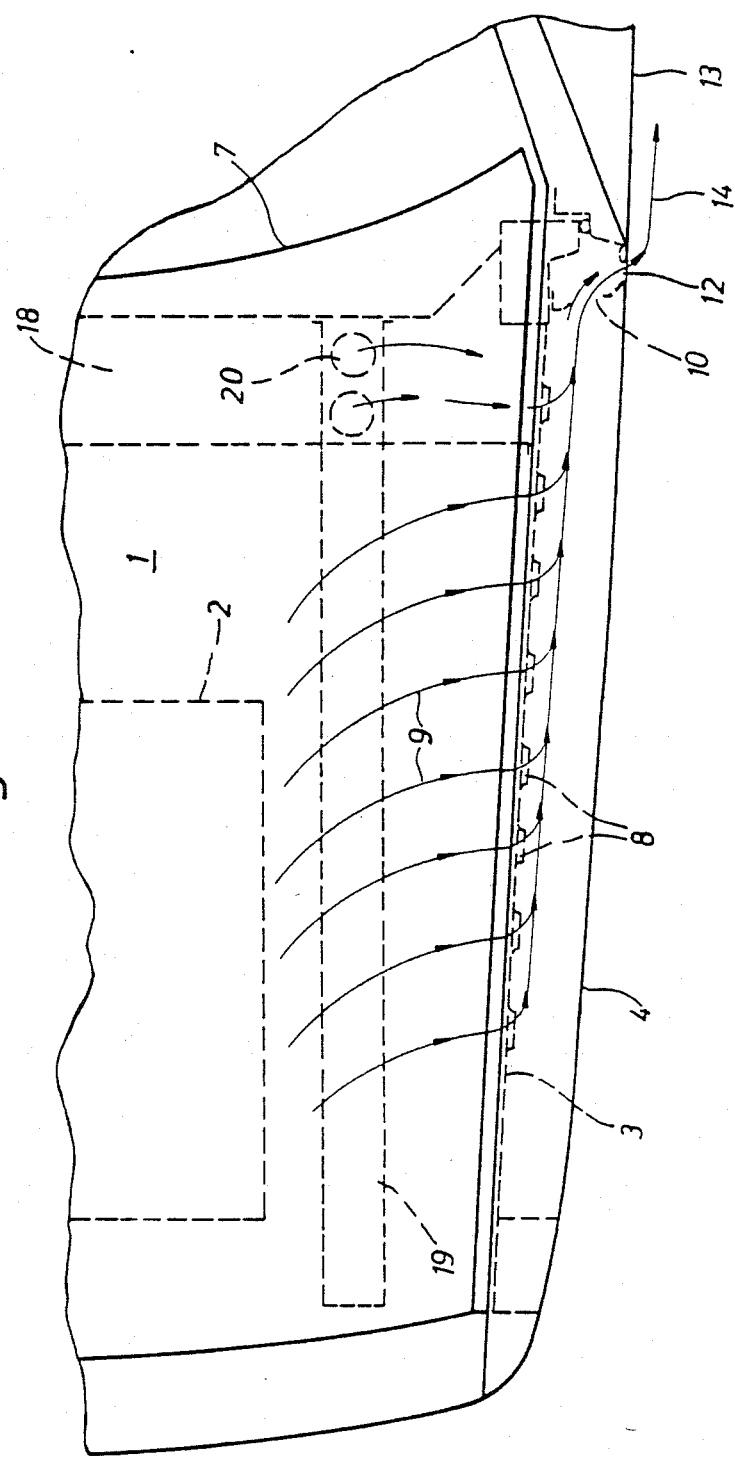
FIG. 2 is a top plan view of the invention shown in FIG. 1.

The portion of the motor vehicle shown in the drawing has a front engine compartment 1 with an indicated internal combustion engine 2, the engine compartment 1 being bounded on each side by an arcuate wheel well panel 3 to which a front quarter panel 4 is fastened, for example by bolts. The space between the arcuate wheel well panel 3 and the quarter panel 4 is covered by a wheel well roof panel 5, preferably made of a plastic material, so that a closed, duct-like cavity 6 is formed. The top the engine compartment 1 is closed in the usual manner by an engine bonnet or hood 7.

The cavity 6 formed in the manner described above communicates with the engine compartment 1 through air inlet apertures 8 formed in the arcuate wheel well panel 3, so that heated air can pass out of the engine compartment 1 into the cavity 6, as indicated by arrows 9.

Air outlet apertures 10 for this heated air are provided in the region of a front wall pillar 11 in the quarter panel bolting zone, so that the air is drawn off during travel, because of the reduced pressure prevailing there, through a front vertical door gap 12 between a door 13 and the quarter panel 4. This outward air path is indicated by arrows 14.

If in exceptional cases the resulting current of air is insufficient, additional gill-like air outlet openings 15 and 16 can be provided respectively in the side wall region of the front quarter panel 4 and in the bottom region of the quarter panel 4, or in ancillary outer fender panels 17 provided there.

In addition, an accessories compartment 18 may be connected to the air guide system described above. The accessories compartment 18 is formed by dividing the engine compartment 1. The accessories compartment is desirably ventilated by means of a front longitudinal member 19, through openings 20.

Although the invention has been described in detail with reference to certain preferred embodiments and specific examples, variations and modifications exist within the scope and spirit of the invention as described and as defined in the following claims.

What is claimed is:

1. An apparatus for discharging hot air from an engine compartment of a motor vehicle having an internal combustion engine disposed in a forward portion thereof, a quarter panel positioned to extend along a side portion of the engine compartment, an elongated wheel well panel situated intermediate the engine compartment and the quarter panel, a wheel well roof member coupled to the quarter panel and to the wheel well panel to form a cavity therebetween, a vehicle door in proximity to the engine compartment, the door having an edge positioned in proximity to the quarter panel to form a vertical door gap therebetween, and a substantially vertical wall adjacent to the edge of the door, the vertical wall being in communication with the wheel well panel and the quarter panel, the apparatus comprising:
- a plurality of air inlets in the wheel well panel to permit heated air to travel from the engine compartment into the cavity, and
- a plurality of air outlets in the substantially vertical wall to permit heated air to travel from the cavity to the surroundings through the vertical door gap defined by the door and the vertical wall.

2. The apparatus of claim 1, wherein the quarter panel includes an outer skin formed to include at least one aperture to permit heated air to travel from the cavity to the surroundings therethrough.

3. The apparatus of claim 1, further including at lease one ancillary outer fender panel, the outer fender panel being formed to include at least one aperture to permit heated air to travel from the cavity to the surroundings therethrough.

4. The apparatus of claim 1, wherein the motor vehicle further includes an accessories compartment adjacent to the engine compartment, and the apparatus further includes means for conducting heated air from the accessories compartment to the cavity.

5. In a motor vehicle having an engine compartment for housing an engine, a quarter panel situated alongside the engine compartment, an elongated wheel well panel situated intermediate the engine compartment and the quarter panel, a vehicle door having an edge positioned in proximity to the quarter panel to form a substantially vertical gap therebetween, and a substantially vertical wall adjacent to the vehicle door, the vertical wall being in communication with the wheel well panel and the quarter panel, the improvement comprising:
- a wheel well roof member coupled to the quarter panel and to the wheel well panel to form an elongated duct for conducting heated air,
- air inlet means, situated in the wheel well panel, for conducting heated air from the engine compartment into the elongated duct, and
- air outlet means, situated in the substantially vertical wall, for conducting heated air from the elongated duct to the surroundings through the vertical door gap defined by the door and the vertical wall.

* * * * *